Oct. 8, 1963   J. A. EARL   3,106,490
CERAMIC MATERIAL AND METHOD OF COATING
Filed Oct. 21, 1960

Fig.1

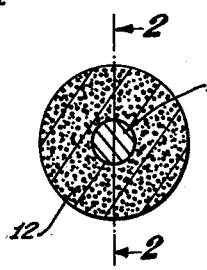

Fig.2

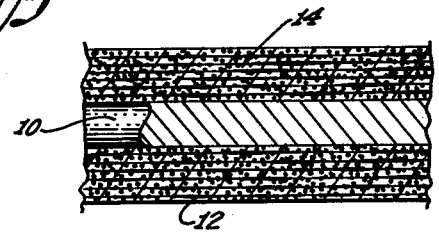

Fig.3

| Material | Fluxes | | Refractory Additives |
| --- | --- | --- | --- |
| | Flux A | Flux B | Proportion by Weight |
| Red Lead ($Pb_3O_4$) | 63.0 | 73.0 | 5.0 |
| Zinc Oxide (ZnO) | — | 5.0 | — |
| Magnesium Oxide (MgO) | 4.0 | — | — |
| Bismuth Trioxide ($Bi_2O_3$) | 20.0 | 10.0 | — |
| Silicon Dioxide ($Si O_2$) | 11.0 | 12.0 | — |
| Cobolt Oxide ($Co_3O_4$) | 2.0 | — | — |
| Lead Titanate ($PbTi_2O_3$) | — | — | 22 |
| Magnesium Titanate ($MgTiO_3$) | — | — | 8 |

Fig.4

| Material | Precentage by Weight |
| --- | --- |
| Flux A | 55 |
| Flux B | 10 |
| Refractory | 35 |

Fig.5

| Material | Proportion by Weight |
| --- | --- |
| Red Lead ($Pb_3O_4$) | 64.06 |
| Zinc Oxide (ZnO) | 0.50 |
| Magnesium Oxide (MgO) | 2.20 |
| Bismuth Trioxide ($Bi_2O_3$) | 12.00 |
| Silicon Dioxide ($Si O_2$) | 7.25 |
| Cobolt Oxide ($Co_3O_4$) | 1.10 |
| Titanium Dioxide ($TiO_2$) | 10.09 |
| Magnesium Titanate ($MgTiO_3$) | 2.80 |

INVENTOR:
John A. Earl
By Smyth, Roston & Pavitt
Attorneys.

United States Patent Office 3,106,490
Patented Oct. 8, 1963

3,106,490
CERAMIC MATERIAL AND METHOD
OF COATING
John A. Earl, Alhambra, Calif., assignor to Physical
Sciences Corporation, Pasadena, Calif., a corporation
of California
Filed Oct. 21, 1960, Ser. No. 64,154
18 Claims. (Cl. 117—221)

This invention relates to a ceramic material for coating such surfaces as nickel and nickel-clad wire and more particularly relates to a ceramic coating material which has a low capture effect of thermoneutrons. The invention also relates to methods of producing the novel ceramic material included in this invention.

Nickel wire and nickel-clad wire are being increasingly adopted for use in various scientific equipment. One reason is that the wire has a relatively high melting temperature. Another reason is that nickel can be easily applied to such electrically conductive materials as copper and steel. Furthermore, the nickel produces an oxide coating which is adaptable to receive materials having good properties of electrical insulation.

Since the nickel wire or nickel-clad wire is disposed in electrical equipment where it can contact other electrically conductive members in the equipment, it is important that the wire be properly insulated. Considerable effort has been devoted to provide a ceramic coating on the wire wherein the wire remains bonded to the wire even when the wire is bent or flexed. In spite of such considerable effort, no completely successful ceramic coating for such conductive wire as nickel and nickel-clad wire has been produced until now. The difficulties have been compounded when a ceramic coating has been desired which can operate properly from the standpoint of electrical insulation even after being exposed to thermoneutrons and other types of radioactivity.

This invention provides a ceramic coating for use on such electrical conductors as nickel and nickel-clad wire. The ceramic coating constituting this invention is advantageous in that it becomes firmly bonded to the surface of the nickel and remains firmly bonded to the nickel even with flexing of the nickel surface and even with considerable variations in such parameters as temperature, pressure and humidity. The ceramic coating constituting this invention is also distinctly advantageous in that it has a low thermoneutron capture effect. This causes the advantageous properties of the ceramic coating to continue even after the ceramic coating has been exposed to a radioactive field containing thermoneutrons.

The ceramic coating constituting this invention includes first and second fluxes. The first flux includes a glass modifier including the oxide of lead, a glass former including the oxide of bismuth and a glass including the oxide of silicon. The first flux also includes an additional glass modifier such as the oxide of magnesium. The second flux also includes the oxides of lead, bismuth and silicon and further includes an additional glass modifier such as the oxide of zinc. Each of the first and second fluxes melts at a temperature considerably lower than the melting temperature of nickel but the second flux melts at a temperature lower than that of the first flux.

Each of the first and second fluxes is individually formed by intimately mixing the various materials included in the flux and then melting the mixture. The first and second fluxes are then formed into particles and are intimately mixed with particles of a refractory material which includes the oxide of lead. The resultant mixture is heated to a temperature greater than the melting temperatures of the first and second fluxes but less than the melting temperature of nickel. The resultant mixture is applied in the heated state to the surface of the nickel to produce the ceramic coating on the surface of the nickel.

In the drawings:

FIGURE 1 is a sectional view illustrating the disposition of the ceramic coating constituting this invention on an electrically conductive wire such as a nickel wire or a nickel-clad wire;

FIGURE 2 is an enlarged fragmentary sectional view substantially on the line 2—2 of FIGURE 1 and further illustrates the disposition of the ceramic coating on the wire;

FIGURE 3 is a table illustrating the relative percentages of the various materials used in the formation of first and second fluxes and a refractory material, all of which are used to form the ceramic coating constituting this invention;

FIGURE 4 illustrates the percentages of the first and second fluxes and the refractory material in forming the ceramic coating constituting this invention; and FIGURE 5 is a table illustrating the relative percentages by weight of the various materials in the ceramic material constituting this invention.

Various materials capable of being used in forming ceramics may generally be divided as follows into three groups or categories:

| Glass modifiers | Glass formers | Glass acid |
|---|---|---|
| Lithium oxide ($Li_2O$). | Arsenic oxide ($As_2O_3$). | Silicon dioxide ($SiO_2$). |
| Sodium oxide ($Na_2O$). | Boron oxide ($B_2O_3$). | Cerium dioxide ($CeO_2$). |
| Potassium oxide ($K_2O$). | Bismuth oxide ($Bi_2O_3$). | Zirconium dioxide ($ZrO_2$). |
| Lead oxide ($PbO$). | Aluminum oxide ($Al_2O_3$). | Titanium dioxide ($TiO_2$). |
| Zinc oxide ($ZnO$). | Lanthanum oxide ($La_2O_3$). | Molybdenum trioxide ($MoO_3$). |
| Strontium oxide ($SrO$). | | |
| Barium oxide ($BaO$). | | |
| Calcium oxide ($CaO$). | | |
| Magnesium oxide ($MgO$). | | |

It will be appreciated that the listing of some of the materials may be considered as somewhat arbitrary since these materials may be considered by some people as belonging in a different one of the lists than set forth above. However, the listing of the materials as set forth above will be considered as proper by many of the experts in the art. It will also be appreciated that other materials may also be included in each of the different categories. For example, the oxides of copper, silver and lead may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or $RO$, where R indicates the element forming the compound with the oxygen (O). The alkalinity of the element in combination with oxygen in the glass forming category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listing in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperature of all of the oxides in the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds may be designated as glass formers in that the compounds in the second category tend to react with the compounds in the third category to form the ceramic materials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramics constituting this invention are formed by combining materials from each of the three categories set forth above. The particular materials used and the properties of such materials are dependent upon the characteristics desired for the ceramics such as glass to be produced from the material. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can be also used as coatings or glazes and designated as "enamels."

The ceramic coating constituting this invention is formed by producing a pair of fluxes each having a different melting temperature. As will be seen from FIGURE 3, flux A is formed from glass modifiers including the oxides of lead, cobalt and magnesium, at least one glass former including the oxide of bismuth and at least one glass including the oxide of silicon. The oxide of lead constitutes the predominant material in the mixture by weight since approximately 63% of lead oxide ($Pb_3O_4$) is included in flux A by weight. Approximately 4% of magnesium oxide (MgO), 2% of cobalt oxide ($Co_3O_4$), 20% of bismuth oxide ($Bi_2O_3$) and 11% of silicon oxide ($SiO_2$) by weight are also included in flux A.

Flux A is producing by intimately mixing particles of the different materials in the flux and by heating the mixture to a temperature of approximately 2100° F. to premelt the mixture into a homogeneous mass. The mixture is then quenched as in water and is ground into fine particles having a size in the order of 400 mesh. It is especially desirable to grind flux A to particles of fine size when the ceramic coating constituting this invention is to be applied to a thin conductive wire such as a wire having a thickness of approximately 0.0025 inch.

The various materials are included in flux A in the specified percentages for certain important reasons. For example, the lead oxide is included in flux A as the primary glass modifier because it has good properties of flexibility. Furthermore, the oxide of lead has a relatively low melting temperature. Because of this, the oxide of lead tends to reduce the melting temperature of flux A, especially since the oxide of lead constitutes the predominant material in flux A by weight. The oxide of lead is also advantageous in that it has a high electrical resistivity.

The oxide of cobalt ($Co_3O_4$) has a relatively low melting temperature and a medium coefficient of expansion. It also constitutes an active glass former. The oxide of cobalt is also advantageous in that it imparts a distinctive blue color to flux A. The oxide of magnesium has a relatively low coefficient of expansion and a relatively high melting temperature. In this way, the oxide of magnesium acts to insure that the mixture comprising flux A becomes progressively melted as the temperature of the mixture is increased toward the temperature of approximately 2100° F. specified above.

All of the materials discussed above as being included in flux A have a relatively low thermoneutron capture effect. This is especially true of the oxide of bismuth, which is included as the glass modifier in the mixture constituting flux A. Materials having a low thermoneutron capture effect are especially desirable for ceramic coatings on wire where the wire is to be used in installations subject to radioactivity including thermoneutrons. The reason is that the electrical properties of the ceramic coating such as the high resistivity of the coating tend to deteriorate when the material captures thermoneutrons. By way of illustration, the oxide of bismuth has a capture effect of approximately 66 barns whereas the oxide of boron has a capture effect of approximately 1548 barns. The oxide of boron has generally been previously used as the glass former in ceramic coatings for wire.

The oxide of bismuth actually may be considered to act both as a glass modifier and as a glass former. Similarly, the oxide of silicon may be considered to act both as a glass and as a glass former. The oxide of silicon tends to produce a glassy state by inclusion in the flux. This glassy state is, of course, modified by the other materials including the oxide of lead, the flexible properties of which tend to overcome the glassy state induced by the oxide of silicon.

The oxides of lead, bismuth and silicon are also included in flux B. As will be seen, the oxide of lead has an even greater percentage by weight in flux B than in flux A. Since the oxide of lead has a relatively low melting temperature, flux B has a somewhat lower melting temperature than flux A. For example, the melting temperature of flux B is approximately 1000° F. whereas the melting temperature of flux A is in the order of 1400° F. The melting temperatures of fluxes A and B are considerably lower than the melting temperature of nickel, this melting temperature being approximately 2650° F. The reduced melting temperature of flux B also results in part from the use of the oxide of zinc, which has a relatively low melting temperature and a moderate coefficient of expansion.

Flux B is produced in a manner somewhat similar to flux A. For example, the different materials in flux B are initially mixed and then heated to a temperature in the order of 1600° F. to 1800° F. to melt all of the materials in the mixture. The melted mixture is then quenched as in water and is ground into relatively fine particles such as particles having a size in the order of 400 mesh. Since flux B is pre-melted as described above, it has a single eutectic temperature, this being approximately 1000° F. as described above.

Fluxes A and B are then mixed in the relative percentages of approximately 55% by weight for flux A and 10% by weight for flux B. A refractory material constitutes the remaining 35% of the mixture by weight. This percentage of approximately 35% by weight is obtained by including approximately 5 parts by weight of red lead ($Pb_3O_4$), 22 parts by weight of lead titanate ($PbTiO_3$) and 8 parts by weight of magnesium titanate ($MgTiO_3$). The lead titanate and the magnesium titanate are desirable in reducing the glassy state of the ceramic coating constituting this invention and in preventing the ceramic coating from being brittle and fracturing easily. The lead titanate and the magnesium titanate may be considered as refractories which include lead oxide (PbO) and magnesium oxide (MgO) to decrease the melting temperatures of the refractories. The lead titanate also increases the imperviousness of the ceramic coating to moisture.

After fluxes A and B and the refractory material have been properly mixed, the mixture is heated to a temperature of approximately 2000° F. As the temperature of the mixture approaches approximately 1000° F., flux B starts to melt. The melting of flux B provides an incipient action in inducing the melting temperature of the other materials in the mixture. As the temperature of the mixture increases above 1000° F. and approaches approximately 1400° F. constituting the eutectic melting temperature of flux A, flux A melts and further induces the melting of the refractory material in the mixture.

The ceramic coating 10 constituting this invention is applied to a thin conductive wire 12 such as a nickel wire or a nickel-clad wire by apparatus described in detail and claimed in copending application Serial No. 46,576, filed August 1, 1960, in the name of Sheridan S. Cannady for a "Wire Coating Apparatus." The apparatus described and claimed in the copending application applies a uniform layer of the ceramic coating 12 to the wire 10 as the wire passes through a furnace. The apparatus also operates to maintain approximately zero tension on the wire as the wire passes through the furnace. The reason for this is to prevent the wire from stretching as the wire becomes heated in the furnace. A tendency for the wire to stretch is especially prevalent when the wire is quite thin, a wire having a thickness of approximately 0.0025 inch being coated by way of illustration.

By using a combination of fluxes A and B and the refractory material, a firm and permanent bond is obtained between the conductive wire 10 and the ceramic coating 12. This bond is facilitated by the deposition of the ceramic coating 12 on the wire 10 in substantially parallel layers or striations such as indicated at 14 in FIGURE 2. These striations extend in a direction substantially parallel to the surface of the wire 10. Because of the particular disposition of the striations 14, the ceramic coating remains firmly bonded to the surface of the wire 10 even when the wire is bent or flexed. The formation of the parallel striations is facilitated by including the oxide of magnesium in flux A and the oxide of zinc in flux B. However, other oxides such as the oxide of strontium can be used to replace the oxide of magnesium.

A firm and permanent bond is also produced between the ceramic coating 12 and the wire 10 as a result of chemical actions when the surface of the wire has a nickel composition. This results from the fact that nickel tends to become oxidized on its exposed surface. The nickel oxide then tends to react with the different materials in the ceramic material constituting this invention to produce a layer constituting a complex combination of the nickel oxide and the ceramic material. This complex combination provides a chemical bond between the nickel and the ceramic coating.

FIGURE 5 illustrates the relative percentages by weight of the different materials included in the ceramic coating constituting this invention. These percentages are obtained by combining the relative percentages of similar materials in fluxes A and B and in the refractory. It will be appreciated that substitutions may be made in the amounts of such materials without departing from the scope of the invention. For example, although red lead ($Pb_3O_4$) has been used in the refractory material because it liberates free oxygen, an equivalent amount of different forms of lead compounds such as litharge (PbO), white lead [$2PbCO_3 \cdot Pb(OH)_2$], lead monosilicate ($PbSiO_3$), lead bisilicate [$PbO \cdot 2(SiO_2)$] or lead trisilicate may be used. Because of this, claims setting forth particular amounts of different materials are considered to include equivalent amounts of different forms of the same materials and are also considered to represent variations from such particular amounts.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A method of coating a member having a nickel surface, including the steps of: producing a first flux having a relatively low melting temperature considerably less than the melting temperature of nickel; producing a second flux having a higher melting temperature than that of the first flux but considerably less than that of nickel; mixing the first and second fluxes with a refractory material to produce a resultant mixture; heating the resultant mixture to an elevated temperature less than the melting temperature of nickel but substantially greater than the melting temperatures of the first and second fluxes; and applying the resultant mixture at the elevated temperature to the nickel surface of the member.

2. A method of coating a member having a nickel surface, including the steps of: producing a first flux including the oxides of lead, bismuth and silicon and having a relatively low melting temperature considerably less than that of nickel; producing a second flux including the oxides of lead, bismuth and silicon and having an elevated melting temperature relative to that of the first flux but considerably less than that of nickel; intimately mixing particles of the first and second fluxes with particles of a refractory material; heating the intimate mixture to a temperature greater than the melting temperatures of the first and second fluxes but less than the melting temperature of nickel; and applying the resultant mixture at the elevated temperature to the nickel surface of the member.

3. A method of coating a member having a nickel surface, including the steps of: mixing the oxides of lead, bismuth and silicon and at least a first additional glass modifier in percentages to provide a substantially greater percentage by weight for the oxide of lead than for the oxides of any of the other elements in the mixture; heating the mixture to a first temperature less than the melting temperature of nickel to melt the oxides for the production of a first flux having a melting temperature considerably less than the melting temperature of nickel, quenching the first flux, and producing fine particles of the first flux; mixing the oxides of lead, bismuth and silicon and at least a second additional glass modifier in percentages to provide a substantially greater percentage by weight for the oxide of lead than for the oxides of any of the other elements in the mixture, heating the mixture to a second temperature less than the melting temperature of nickel but greater than the temperature of heating the first mixture to melt the oxides for the production of a second flux having a melting temperature greater than that of the first flux but considerably less than the melting temperature of nickel, quenching the second flux, and producing fine particles of the second flux; providing particles of a refractory material; intimately mixing the particles of the refractory material and the first and second fluxes to produce a resultant material; and applying the resultant material to the nickel surface at a temperature less than the melting temperature of the nickel but greater than the melting temperatures of the first and second fluxes.

4. The method set forth in claim 3 in which the additional glass modifier in the first flux is the oxide of zinc and in which the additional glass modifier in the second flux is the oxide of magnesium and in which the refractory material includes the oxides of lead, titanium and magnesium.

5. A material for application to a member having a nickel surface, including, a first flux having a relatively low melting temperature considerably less than that of nickel and including the oxides of lead, bismuth and silicon in the respective percentages of approximately 63%, 20% and 11% by weight; a second flux having an intermediate melting temperature considerably less than that of nickel and less than the melting temperature of the first flux and including the oxides of lead, bismuth and silicon in the respective percentages of approximately 73%, 10% and 12% by weight; and a refractory material including the oxide of lead in a percentage of approximately 65% by weight; the first flux, the second flux and the refractory material being mixed in respective proportions of approximately 55%, 10% and 35% by weight to produce a melting temperature for the mixture between the melting temperatures of the first and second fluxes and the melting temperature of nickel.

6. A material having a low thermonuclear capture effect for coating a member having a nickel surface, including, a first flux including the oxides of bismuth and lead in respective percentages of approximately 20% and 63% by weight and having a melting temperature considerably less than that of nickel, a second flux including the oxides of bismuth and lead in respective percentages of approximately 10% and 73% by weight and having a melting temperature less than that of the first flux, and a refractory material including the oxide of lead in a percentage of approximately 65% by weight of lead.

7. The coating material set forth in claim 6 in which the second flux is included in the coating material in a considerably greater percentage by weight than the first flux.

8. The coating material set forth in claim 6 in which the first flux is included in the coating material in a considerably greater percentage by weight than the second flux and in which the oxide of silicon is included in each of the first and second fluxes in respective percentages by weight of approximately 11% and 12%.

9. A ceramic coating material having a low thermonuclear capture effect for coating a member having a nickel surface, including, the oxides of lead, silicon and bismuth intermixed in a first flux having a melting temperature considerably less than the melting temperature of nickel with the oxides of lead, silicon and bismuth having respective percentages by weight of approximately 63%, 11% and 20%; the oxides of lead, silicon and bismuth intermixed in a second flux having a melting temperature considerably less than that of nickel and less than that of the first flux with the oxides of lead, silicon and bismuth having respective percentages by weight of approximately 73%, 12% and 10%; and a refractory material, the first and second fluxes and the refractory material being intermixed and melted at a temperature higher than the melting temperatures of the first and second fluxes but less than that of nickel to produce the coating material.

10. A ceramic material having a low thermonuclear capture effect for coating a member having a nickel surface, including, at least one glass former including the oxide of lead having a percentage of approximately 64% by weight, at least one glass including the oxide of silicon having a percentage of approximately 7% by weight, and at least one glass modifier including the oxide of bismuth having a percentage of approximately 12% by weight, the glass former, the glass and the glass modifier being intermixed and melted to form the ceramic material.

11. A ceramic material having a low thermonuclear capture effect for coating a member having a nickel surface, including, a first flux including at least one glass former including the oxide of bismuth in the percentage of approximately 20% by weight, at least one glass including the oxide of silicon in the percentage of approximately 11% by weight, and at least a pair of glass modifiers one of which constitutes the oxide of lead in the percentage of approximately 63% by weight, the different materials in the first flux being intermixed and melted to produce a melting temperature considerably less than the melting temperature of nickel; a second flux including at least one glass former including the oxide of bismuth in the percentage of approximately 10% by weight, at least one glass including the oxide of silicon in the percentage of approximately 12% by weight, and at least a pair of glass formers one of which constitutes the oxide of lead in the percentage of approximately 73% by weight, the different materials in the second flux being intermixed and melted to produce a melting temperature considerably less than the melting temperature of nickel and less than the melting temperature of the first flux; and a refractory material including the oxide of lead in the percentage of approximately 65% by weight; the first and second fluxes and the refractory material being intermixed and melted at a temperature greater than the melting temperatures of the first and second fluxes but less than the melting temperature of nickel to produce the ceramic material.

12. The ceramic material set forth in claim 11 in which the oxide of zinc is included as the second glass modifier in the second flux in the percentage of approximately 5% by weight and in which the oxide of magnesium is included as the first glass modifier in the second flux in the percentage of approximately 4% by weight and in which the oxide of magnesium is included in the refractory material in the percentage of approximately 29% by weight.

13. A ceramic material having a low thermonuclear capture effect for coating a wire having a nickel surface, including, a glass former including the oxide of bismuth in the percentage of approximately 12% by weight, a glass including the oxide of silicon in the range of approximately 7% by weight and at least a pair of glass modifiers including the oxides of lead and magnesium in the respective percentages of approximately 64% and 3% by weight, the oxides of bismuth, silicon, lead and magnesium being intermixed to provide the ceramic material.

14. The ceramic material set forth in claim 11 in which the ceramic material is formed to include first and second fluxes each having a melting temperature less than the melting temperature of nickel but the first flux having a higher melting temperature than the second flux.

15. A ceramic material having a low thermonuclear capture effect for coating a member having a nickel surface, including a mixture of: a first ceramic composition having a melting temperature considerably less than the melting temperature and including the following percentages of materials by weight:

| Material: | Percentage by weight |
|---|---|
| Red lead ($Pb_3O_4$) | 63.0 |
| Magnesium oxide (MgO) | 4.0 |
| Bismuth trioxide ($Bi_2O_3$) | 20.0 |
| Silicon dioxide ($SiO_2$) | 11.0 |
| Cobalt oxide ($Co_3O_4$) | 2.0 | a second ceramic composition having a melting temperature less than that of nickel and including the following percentages of materials by weight:

| Material: | Percentage by weight |
|---|---|
| Red lead ($Pb_3O_4$) | 73.0 |
| Zinc oxide (ZnO) | 5.0 |
| Bismuth trioxide ($Bi_2O_3$) | 10.0 |
| Silicon dioxide ($SiO_2$) | 12.0 | and a refractory material including the following relative portions of materials by weight:

| Material: | Relative portions of materials |
|---|---|
| Red lead ($Pb_3O_4$) | 5.0 |
| Lead titanate ($PbTiO_3$) | 22.0 |
| Magnesium titanate ($MgTiO_3$) | 8.0 |

16. The ceramic material set forth in claim 15 in which the first ceramic composition has approximately 55% by weight and in which the second ceramic composition has approximately 10% by weight and in which the refractory material has approximately 35% by weight.

17. A method of coating a member having a nickel surface, including the steps of: mixing the following materials in the following percentages by weight:

| Material | Percentage by weight |
|---|---|
| Red lead ($Pb_3O_4$) | 63.0 |
| Magnesium oxide (MgO) | 4.0 |
| Bismuth trioxide ($Bi_2O_3$) | 20.0 |
| Silicon dioxide ($SiO_2$) | 11.0 |
| Cobalt oxide ($Co_3O_4$) | 2.0 | melting the materials at a temperature of approximately 2000° F. to produce a first ceramic composition having a eutectic melting temperature of approximately 1400° F., quenching the first ceramic composition, and producing fine particles of the first ceramic composition; mixing the following materials in the following percentages by weight:

| Material: | Percentage by weight |
|---|---|
| Red lead ($Pb_3O_4$) | 73.0 |
| Zinc oxide (ZnO) | 5.0 |
| Bismuth trioxide ($Bi_2O_3$) | 10.0 |
| Silicon dioxide ($SiO_2$) | 12.0 | melting the materials in the second mixture at a temperature of approximately 1400° F. to 1600° F. to produce a second ceramic composition having a eutectic melting temperature of approximately 1000° F., quenching the second ceramic composition, and producing fine particles of the second ceramic composition; mixing the following materials in the relative proportions by weight:

| Material: | Relative proportions by weight |
|---|---|
| Red lead ($Pb_3O_4$) | 5.0 |
| Lead titanate ($PbTiO_3$) | 22.0 |
| Magnesium titanate ($MgTiO_3$) | 8.0 | mixing the first and second fluxes and the refractory material in particular percentages to produce a ceramic material; and applying the ceramic material in melted form at a temperature of approximately 2000° F. to the surface of the wire.

18. The method set forth in claim 17 in which the first and second ceramic compositions and the refractory material are respectively mixed in the percentages of 55, 10 and 35 by weight to produce the ceramic material.

References Cited in the file of this patent

UNITED STATES PATENTS

| 2,663,658 | Schurecht | Dec. 22, 1953 |
| 2,717,946 | Peck | Sept. 13, 1955 |

FOREIGN PATENTS

| 19,709 | Great Britain | A.D. 1906 |